United States Patent [19]

Reynolds et al.

[11] Patent Number: 4,902,100

[45] Date of Patent: Feb. 20, 1990

[54] METHOD AND APPARATUS FOR REMOVING PHASE ABERRATIONS IN WINDOWS USING BROADBAND PHASE CONJUGATION

[75] Inventors: George O. Reynolds, Waban; Donald A. Servaes, Burlington, both of Mass.

[73] Assignee: Honeywell Inc., Minneapolis, Minn.

[21] Appl. No.: 869,519

[22] Filed: Jun. 2, 1986

[51] Int. Cl.[4] .............................. G02B 27/56; G02B 27; G02B 40; G02B 5/32

[52] U.S. Cl. .................................... 350/320; 350/3.7; 350/417; 350/432; 350/443

[58] Field of Search ....................... 350/3.66, 3.7, 320, 350/417, 432, 443

[56] References Cited

U.S. PATENT DOCUMENTS

| | | | |
|---|---|---|---|
| 3,619,021 | 11/1971 | Biedermann et al. | 350/3.7 |
| 3,646,335 | 2/1972 | Cindrich | 350/3.66 X |
| 3,708,217 | 1/1973 | McMahon | 350/3.7 |
| 3,760,344 | 9/1973 | Hildebrand | 350/3.66 X |
| 4,421,380 | 12/1983 | McGrew | 350/3.78 |

OTHER PUBLICATIONS

Reynolds, G. et al., "Phase Conjugation with Incoherent Radiation," *Journal of the Optical Society of America*, vol. 72, No. 12, Dec. 1982, p. 1746.

Kogelnik, H., "Holographic Image Projection Through Inhomogeneous Media," *Bell System Technical Journal*, vol. 44, No. 10, Dec., 1965, pp. 2451-2455.

Reynolds, G. et al., "Holographic Phase Compensation Techniques Applied to Human Cataracts," *Optical Engineering*, vol. 12, No. 1, Jan./Feb., 1973, pp. 23-35.

Shen, M. et al., "Lensless Matched Spatial Filter Correlator Experiments," *Optics Communications*, vol. 34, No. 3, Sep. 1980, pp. 311-315.

Angus, J. et al., "Infrared Image Construction with Computer-Generated Reflection Holograms," *Applied Optics*, vol. 16, No. 11, Nov., 1977, pp. 2798-2799.

Primary Examiner—Bruce Y. Arnold
Assistant Examiner—Terry S. Callaghan
Attorney, Agent, or Firm—Kinney & Lange

[57] ABSTRACT

A method and apparatus are disclosed for correcting complex phase aberrations in a thick window in an airborne vehicle using the technique of phase conjunction. A conjugate element of the window is fabricated by machining. The conjugate element and an imaging lens are positioned behind the window such that the window is imaged onto the conjugate element. Phase aberrations produced when broadband radiation is passed through the window are removed when the wavefront passes through the imaging lens and conjugate element. In another embodiment, halogram is prepared of the wavefront passing through the window. The spatial phase information encoded in the hologram is read out by a phase measurement system and then fed into a computer where the conjugate wavefront is calculated. The conjugate wavefront is then written into a thin corrector plate of refractive material. The corrector plate with the conjugate wavefront imprinted thereon is then placed at the location where the hologram was initially formed. Phase aberrations produced when broadband radiation is passed through the window are removed when the wavefront passes through the plate. In another embodiment, the hologram is made of the conjugate element and imaging lens as positioned behind the window for phase aberration correction purposes instead of the window itself.

17 Claims, 3 Drawing Sheets

METHOD AND APPARATUS FOR REMOVING PHASE ABERRATIONS IN WINDOWS USING BROADBAND PHASE CONJUGATION

BACKGROUND OF THE INVENTION

The present invention relates generally to a method and apparatus for removing aberrations in optical surfaces and more particularly to a method and apparatus for removing complex phase aberrations in windows or other optical surfaces using broadband phase conjugation technology.

The aerodynamic performance requirements for aircraft, missiles or other sensor platforms often necessitate the use of windows that have curved surfaces which are not symmetrical. In addition, these windows often exhibit localized manufacturing errors, such as thickness and curvature variations as well as prismatic or wedge effects. These imperfections and asymmetries result in complex distortions of a scene when it is viewed through such windows. Some of the distortions may be characterized as follows: (1) localized or global shape distortioons, (2) variable or localized magnification caused by the variations in optical power of the window, (3) one-dimensional magnifications and shifts caused by unequal curvatures of the window in different directions, and (4) other distortions caused by geometrical and/or surface defects on the outside surface of the window, the inside surface of the window or both the outside and inside surfaces of the window.

Sometimes the distortion caused by these irregularities is so severe that no recognizeable image can be obtained. Therefore, errors of this magnitude may be devastating to the performance of an imaging sensor placed behind the window. Similarly, these errors may significantly effect the judgement of a pilot viewing a scene through the window or sensor image because of binocular deviations or disparity. Because of these distoritons, the design of windows on high speed platforms used in conjunction with imaging sensors has, unfortunately, often been controlled primarily by the sensor imaging requirements, rather than by the aerodynamic requirements. In other instances the problem of image distortation caused by window aberrations has been avoided by simply eliminating the window element itself and viewing the scene to be observed through a hole in the aircraft. Both of these solutions compromise the performance of the vehicle.

The process of phase conjugation, which results from multiplying a complex wavefront by its complex conjugate is a well-known technique for correcting wavefront distortion. For example, the technique is commonly used to design aspheric corrector plates or aspheric elements for optical imaging systems. Although the plates are refractive, they generally correct only the aspheric portions of the wavefront for rotationally symmetrical aberrations, unlike the aberrations of the typical window in an airborne vehicle in which the entire asymmetric wavefront must be corrected.

Phase conjugation techniques using conjugate refractive (or reflective) type elements have been used in a variety of other circumstances to correct wavefront distortion. For example, in non-linear optics, a non-linear medium is used in conjunction with four-wave laser mixing to create real-time phase conjugated (corrected) wavefronts. Conjugate wavefrons have also been used to dynamically remove the effects of atmospheric turbulence from telescopes and other optical systems. In this type of application, referred to as "adaptive optics," interferometric measurements and appropriate servo loops are used to drive flexible optical elements to dynamically realize phase conjugations, and thus wavefront correction.

As far as is known, however, broadband phase conjugation has not been used to correct complex phase aberrations in aerodynamic windows or other types of "thick" surfaces (i.e. surfaces more than about a few millimeters thick).

Phase conjugation using diffraction rather than refraction or reflection is also known in the art. An example of this is holography. In a paper by G. O. Reynolds, J. L. Zuckerman, W. A. Dyes and D. Miller entitled "Holographic Phase compensation Techniques Applied to Human Cataracts," appearing in Opt. Eng. Vol. 12 No. 1, Feb., 1973, it is disclosed that laser holography can be used to see through excised human cataacts. As set forth in that paper, an extracted cataract from a human eye (representing an asymetrically distorted optical element) was mounted in a Mach-Zehnder interferometer illuminated by a laser. A hologram was constructed of the cataract at the image plane of the interferometer by well-known holographic techniques. The hologram was then placed in the same position as recorded, and the reference beam of the interferometer was blocked such that light from the laser source was transmitted through both the cataract and the corrector hologram (its conjugate element). A target placed beyond the aberrated lens (the cataract) could then be read, thus demonstrating that holographic phase conjugation techniques can be used to view a target through a badly aberrated lens using coherent light. Holographic correction has also been performed on wavefronts created by other randomizing media, as described, for example, by H. Kogelnik in "Holographic Image Projection Through Inhomogeneous Media," Bell System Tech. J. Vol. 44, p. 2451 (1965).

As can be appreciated, the laser holographic approach used in conjunction with an extracted cataract as described above, is not satisfactory for solving the aberration problems posed by a complex window. First, this technique uses a laser and as such works only for one wavelength of light (that of the coherent illumination source). It can not be used in broadband sensor applications because the diffraction effect of the hologram varies as a function of wavelength. Second, coherent illumination of the hologram is required to obtain the conjugate of the window from the hologram. Thus, the scene desired to be viewed would also have to be laser illuminated, which would also defeat the purpose of correcting for a broadband sensor application.

A talk pertaining to broadband phase conjugation using thin flat plate aberrators and entitled Phase Conjugation With Incoherent Radiation was presented by G. O. Reynolds, D. A. Servaes and J. B. DeVelis on Oct. 19, 1982 at the 1982 annual meeting of the Optical Society of America and is summarized on page 1746 of the Journal of Optical Society of America, Dec. 1982, Volume 72.

A talk entitled, "Phase Conjugation with Partially Coherent Radiation," was presented by D. A. Servaes, J. B. DeVelis and G. O. Reynolds, at the Optical Computing Conference, M.I.T. Boston, Mass., on Apr. 7, 1983. In both of the above talks it was shown that a thin, flat glass plate randomly scratched on one side could be passively phase conjugated for use with white light (i.e.

broadband radiation) by placing a nearly index matched plastic replica of that plate in the image plane of the plate formed by an imaging lens, thereby creating a substantially undistorted image of a target when viewed through the lens by another imaging system.

In both of the above instances, the conjugate replica was made by placing the random glass surface against a sheet of optical quality plastic and then transferring the aberrations to the sheet of plastic by applying heat and pressure with a thermal laminating press.

It is accordingly an object of this invention to provide a new and improved method and apparatus for correcting phase aberrations in an optical surface using phase conjugation.

It is another object of this invention to provide a method and apparatus for correcting phase aberrations in a thick non-planar, optical surface such as an optical window in an aerodynamic vehicle, in order to further improve the image quality of a sensor system or viewer positioned behind the window.

SUMMARY OF THE INVENTION

According to one aspect of the invention, a conjugate element is constructed for removing phase aberrations in a thick window in an aircraft by either machining or molding. The window itself is also made using optical quality material. The conjugate element is positioned behind the window. An imaging lens is placed between the window and the conjugate element and the two elements positioned relative to each other such that the window is imaged onto the conjugate element, thereby correcting the distorted wavefront caused by the window when viewed from a position behind the conjugate element.

According to another aspect of the invention, a hologram of the wavefront created by an imaging lens and conjugate element disposed behind a window to phase conjugate the wavefront passing through the window is made by replacing the window with a plate of photographic film and illuminating the system from the direction of the conjugate element using a coherent source of appropriate wavelength. The hologram so formed diffractively encodes at a single wavelength information about the wavefront necessary to conjugate the window. The spatial phase information encoded in the hologram is read off of the hologram using a computer controlled phase measurement system and then transferred to a thin corrector plate which is either refractive or reflective, as desired. The corrector plate so formed is in effect the refractive (or reflective) equivalent of the imaging lens and conjugate element at the position where the hologram was encoded. The window is then replaced in its original positon the coorector plate positioned where the hologram was made and the conjugate and imaging lens removed. An undistorted image results when a scene is viewed through both the corrector plate and the window.

According to another aspect of the invention a hologram is made of the wavefront created by the window itself rather than of a conjugate element and imaging lens combination used to correct aberrations in the window and the spatial phase information encoded therein is transferred to a refractive or reflective corrector plate. Two versions of this arrangement are disclosed, one where the window is imaged (by a lens) onto the film where the hologram is formed and the other where the window is not imaged onto the film. Two different arrangements are disclosed for using the corrector plate formed from the hologram made by imaging the window onto the film.

Several different arrangments are described for making the corrector plate from the hologram, including one indirectly by replication from a photo-resist plate after exposure by an electron beam or optical (laser) writer and another direclty by using a scribing machine and an appropriate blank plate.

Various objects and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

For illustratives purposes, the invention will hereinafter be described with reference to correcting complex phase aberrations produced by irregularities on the outside surface of a window on an aircraft. It should be understood, however, that the invention is not limited to correcting phase aberrations caused by irregularities on only the outside surface of a window but rather is also applicable to correcting phase aberrations caused by irregularities on the inside surface of a window or for that matter on both surfaces of a window. It should also be understood that the invention is not limited to correcting phase aberrations caused by irregularities on only aircarft windows but rather is usefujl in correcting phase aberrations caused by irregularities in other types of optical elements or surfaces and especially, but not exclusively limited to, thick surfaces.

Figure 1:
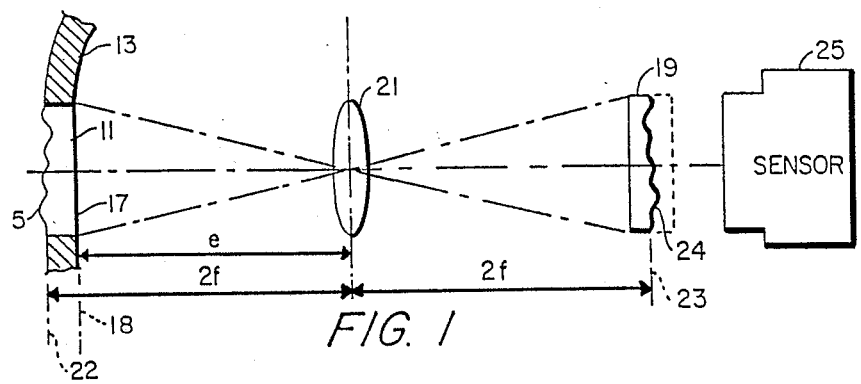
FIG. 1 shows a window mounted in the frame of an aircraft along with a conjugate element and imaging lens combination constructed, according to the present invention, for correcting phase aberrations in the window. Also shown is a sensor disposed inside the aircraft for imaging a scene outside the aircraft through the window.

Referring now to the drawings there is shown in FIG. 1 a window 11 mounted on the frame 13 of an aircraft. Window 11 has a thickness of more than a few millimeters. Window 11 includes an outside surface 15 having irregularities producing complex phase aberrations which are to be corrected according to this invention and an inside surface 17 which is flat and will be considered as having no geometrical and/or surface defects. For illustrative purposes, the irregularities in surface 15 causing the complex phase aberrations are greatly enlarged. Window 11 is made of optical quality material.

The phase aberrations in surface 15 are corrected using a conjugate element 19 and an imaging lens 21. Conjugate element 19 is made of optical quality plastic, has about the same index of refraction as window 11 and is made by molding or machining. Lens 21 is a 1:1 imaging lens. Lens 21 is positioned at a distance $2f$ from plane 22, the plane in which the outside surface 15 of window 11 is disposed and at a distance $2f$ from plane 23, the plane in which the corrective surface 24 of conjugate element 19 is disposed. Thus, window 11 is imaged onto conjugate element 19 with the aberrated surface 15 of window 11 and phase conjugate surface 24 of conjugate element 19 mating so as to form a clear window. Also shown in FIG. 1 is a sensor 25, such as an ultraviolet, visible or infrared camera, which is positioned for recording a scene outside of the aircraft through window 11.

Instead of using conjugate element 19 and imaging lens 21 to correct the phase aberrations in window 11, the phase aberrations may be corrected by making a hologram based on the phase aberrations present in window 11, then using the information contained in the hologram to write the conjugate wavefront onto a corrector plate (which is either refractive or reflective) and then placing the corrector plate so fabricated at an appropriate location as will hereinafter be explained. Phase aberrations in the wavefront will be corrected (removed) when broadband radiation (i.e. such as white light) is passed through window 11 and subsequently passed through the corrector plate. The hologram can be made either from the conjugate element 19 and imaging lens 21 combination shown in FIG. 1, or directly from window 11 itself. Several different arrangements for making the hologram, making the corrector plate and using the corrector plate so made will now be discussed.

Figure 2:
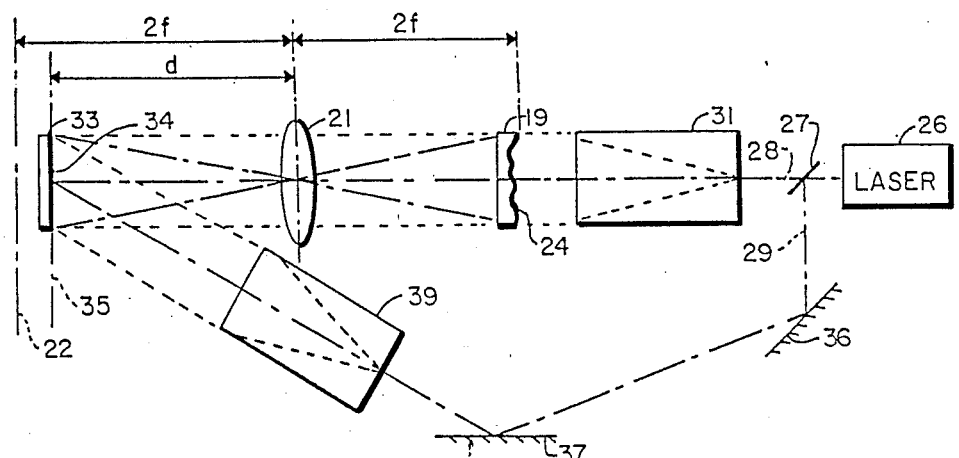
FIG. 2 shows a system according to the present invention for making a hologram of the conjugate element and imaging lens shown in FIG. 1.

Referring now to FIG. 2 there is shown a system for making a hologram from conjugate element 19 and imaging lens 21 combination arranged relative to window 11 as shown in FIG. 1. Light from a laser 26 impinges on a beam splitting mirror 27 where it is split up into two paths 28 and 29. Light in path 28 is passed through a beam expander 31, conjugate element 19, lens 21 and impinges on a plate 33 of photographic film. Plate 33 is positioned so that its front surface 34 is in a plane 35. The distance "d" from plane 35 to lens 21 is about the same as the distance "e" from surface 17 to lens 21. Light in path 29, which is the reference beam, is deflected off a pair of flat mirrors 36 and 37, is passed through a beam expander 39, and then impinges on plate 33 where it combines with the beam from path 27 to form a hologram.

The hologram so formed encodes, diffractively, information about the wavefront necessary to prepare the conjugate of window 11.

Figure 3:
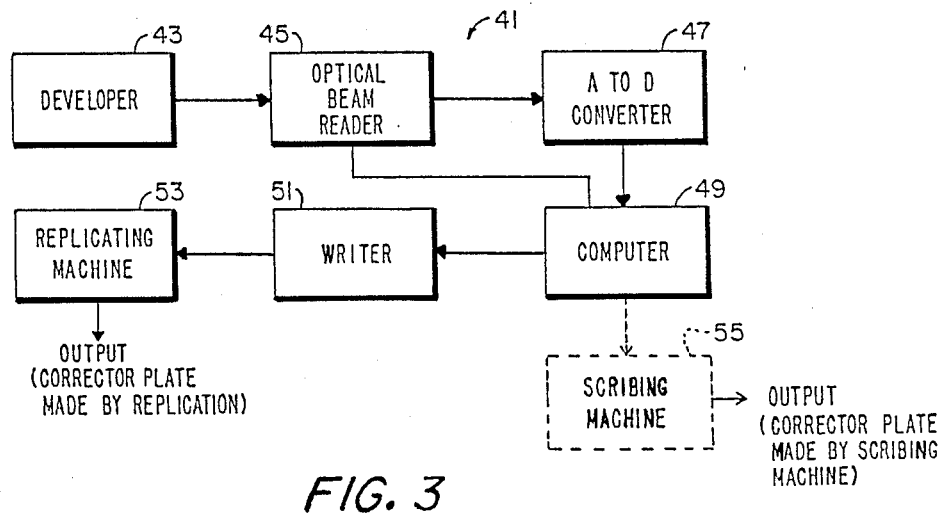
FIG. 3 is a block diagram of an apparatus according to the present invention for making a corrector plate from the hologram made using the system shown in FIG. 2.

Referring now to FIG. 3 there is shown a block diagram of an apparatus 41 for making a single element thin plate corrector from the hologram formed by the system in FIG. 2.

Apparatus 41 includes a developer 43, a computer controlled optical beam reader 45, an analog to digital converter 47, a computer 49, a writer 51 which may be either optical or electron beam and a replicating machine 53. Developer 43 develops the photogrpahic film containing the hologram. The spatial information encoded in the hologram is scanned with computer controlled optical beam reader 45 which measures the transmission of light over the developed plate, point by point The output of optical beam reader 45 is fed into analog to digital converter 47 where it is digitized. The digitized information is then fed into computer 49 where the optical phase (phase function) as a function of x and y is calculated for the particular wavelength used to make the hologram. The phase function (or conjugate wavefront) is fed into writer 51 which writes the phase onto a photo-resist coated plate. The photo resist coated plate is then processed and placed into replicating machine 53 to form a thin corrector plate on an appropriate (blank) medium. Instead of forming the corrector element by replication, a deposition technique may be employed.

Instead of using an electron beam writer 1 controlled by computer 49, a photo-resist coated plate and a replication technique for making the corrector plate, a scribing machine 55, such as an precision numerically controlled lathe or milling machine, also controlled by computer 49, may be used to scribe (cut) the information directly onto a thin corrector plate (blank). For simplicity, this alternate arrangement is also shown in FIG. 3. In either case, the thin corrector plate so produced may either be refractive or reflective, as desired.

As can be appreciated, the thin plate formed using the hologram made in the FIG. 2 system is the refractive (or reflective) equivalent of the conjugate element and lens at the plane 35 where the hologram was actually formed. When being used, the plate is positioned where the hologram was initially made, namely, in plane 35.

Figure 4:
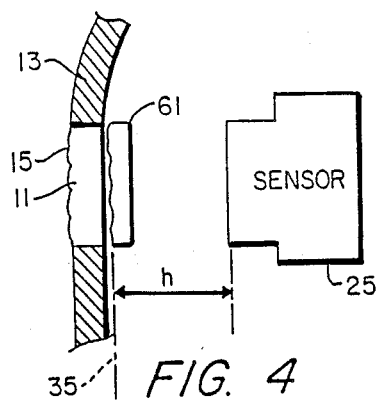
FIG. 4 shows how the corrector plate fabricated using the apparatus in FIG. 3 from the hologram made in FIG. 2 is positioned for use in the aircraft in FIG. 1.

A corrector plate so coonstructed and identified by reference numeral 61 is shown in FIG. 4 in position in plane 35 for use with window 11. As can be seen, conjugate element 19 and imaging lens 21 are omitted, since the phase correction is achieved through corrector plate 61. As can also be seen, sensor 25 at any convenient distance "h" from window 11 sufficient to allow the placement of plate 61 and need not be spaced from window 11 at a distance such as in FIG. 1. As can be appreciated, distance "h" can be considerably less than the distance from window 11 to sensor 25 in the FIG. 1 arrangement.

Figure 5:
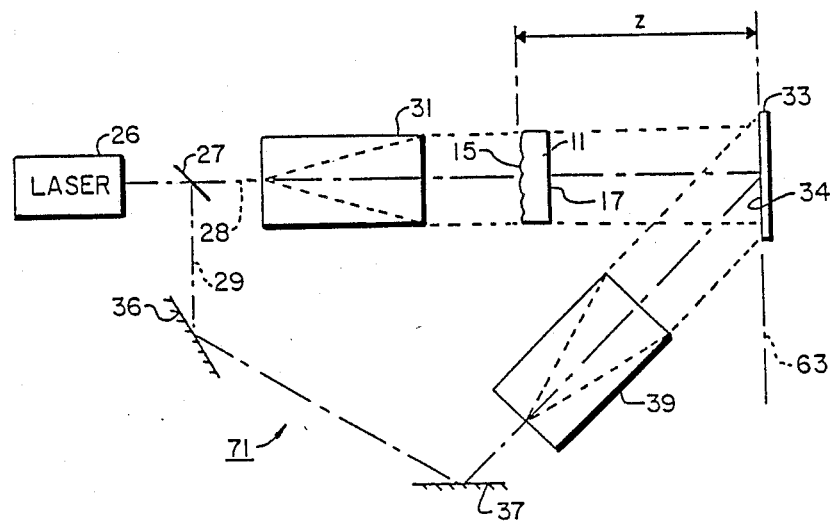
FIG. 5 shows a system according to the present invention for making a hologram of the window shown in FIG. 1.
Figure 6:
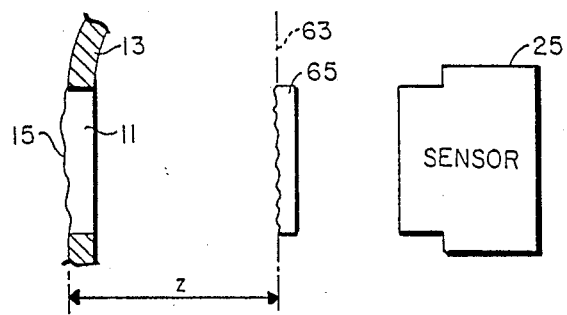
FIG. 6 shows how a corrector plate fabricated from the hologram made using the system in FIG. 5 is positioned for use.

Instead of making the hologram from the conjugate element 19 and imaging lens 21 as shown in the FIG. 2 system, the hologram can be made directly from window 11. This arrangement 71 is shown in FIG. 5. As can be seen, laser 26 is positioned on the aberrated surface side of window 11. Photographic plate 33 is positioned on the other side of window 11 with its front surface 34 in plane 63, plane 63 being at any convenient distance Z from the plane of surface 15 that will enable plate 33 to receive beam 29 as well as beam 28. The principal advantage of the FIG. 5 arrangement is that it eliminates the necessity of having to make a conjugate element 19. The corrector plate 65 is made from the hologram in substantially the same way as described above using information from the hologram to calculate the conjugate wavefront. The corrector plate so constructed is positioned for use as shown in FIG. 6 in plane 63, the plane where the hologram was initially formed.

Figure 7:
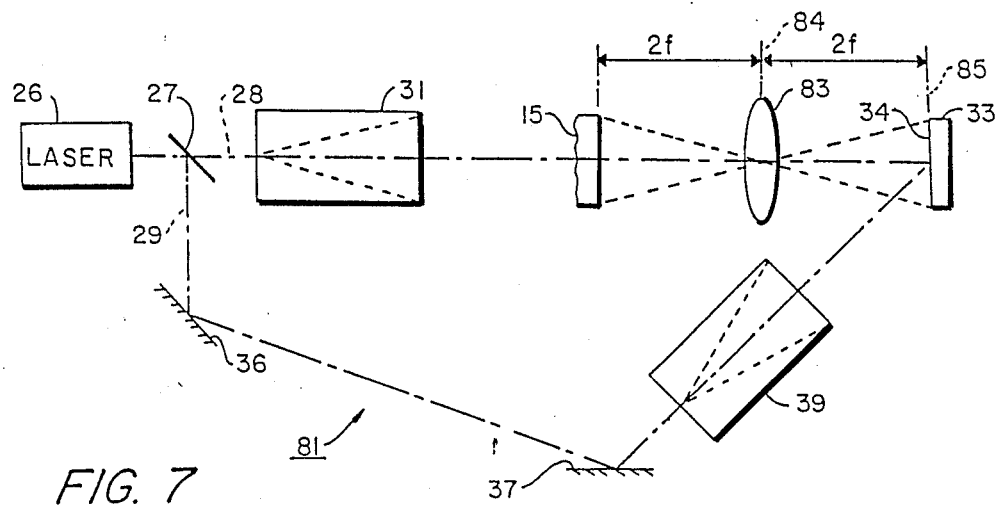
FIG. 7 shows another system according to the present invention for making a hologram of the window shown in FIG. 1.
Figure 8:
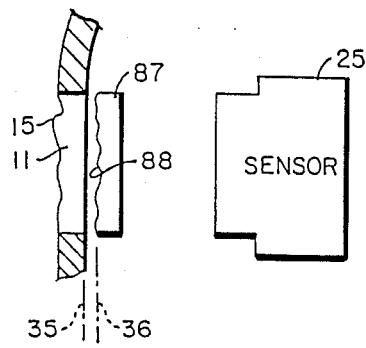
FIG. 8 shows one arrangement of how a corrector plate fabricated from the hologram made using the system in FIG. 7 is positioned for use.
Figure 9:
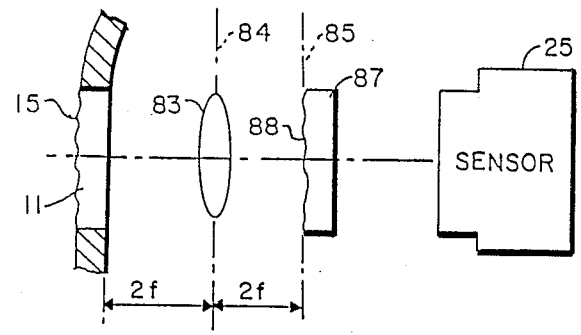
FIG. 9 shows another arrangement of how the corrector plate fabricated from the hologram made using the system in FIG. 8 is positioned for use.

Referring now to FIG. 7 there is shown another system 81 for making a hologram from window 11. System 81 is similar to system 71 shown in FIG. 5, the difference being that system 81 also includes a one to one imaging lens 83 disposed in plane 84, the plane being between window 11 and photographic plate 33 at a distance $2f$ from surface 17 (plane 35) and a distance $2f$ from surface 34 of film plate 33, which surface is in plane 38. The hologram made using system 81 is processed using apparatus 41 to make a corrector plate 87. In use, corrector plate 87 can either be disposed with its corrective surface 88 just in front of plane 35 in plane 36 and used without lens 83 as shown in FIG. 8 or disposed in plane 85 and used with lens 83 as shown in FIG. 9.

The embodiments of the present invention are intended to be merely exemplary and those skilled in the art shall be able to make numerous variations and modifications without departing from the spirit of the present invention. All such variations and modifications are intended to be within the scope of the present invention as defined in the appended claims.

What is claimed is:

1. A method of removing complex phase aberrations in a window comprising the steps of:
   a. making a hologram based on the wavefront created by the window,
   b. reading out the spatial phase information encoded on the hologram,
   c. calculating the conjugate wavefront from the spatial phase information,
   d. transferring the conjugate wavefront onto a corrector plate, and
   e. placing the corrector plate on one side of the window,
   f. whereby phase aberrations caused by the window will be removed when a scene is viewed with incoherent light through the window and the corrector plate.

2. The method of claim 1 and wherein making the hologram based on the wavefront created by the window comprises making a hologram of light passed through the window.

3. The method of claim 2 and wherein reading out the spatial information encoded on the hologram comprises scanning the hologram with an optical beam reader.

4. The method of claim 3 and wherein transferring the conjugate wavefront onto a plate comprises:
   a. feeding the conjugate wavefront information into an electron beam writer,
   b. writing the information from said electron beam writer onto a photo-resist plate, and
   c. preparing a permanent plate from said photo-resist plate by replication or deposition.

5. The method of claim 3 and wherein transferring the conjugate wavefront onto a plate comprises:
   a. feeding said conjugate wavefront information into a cutting machine and
   b. cutting a plate using said cutting machine.

6. The method of claim 1 and wherein making a hologram based on the wavefront created by the window comprises:
   a. making a conjugate element of the window,
   b. placing the conjungent element and an imaging lens behind the window such that the window is imaged onto the conjugate element and then.
   c. making a hologram of light passed through the lens and conjugate element.

7. The method of claim 6 and wherein reading out the spatial information encoded on the hologram comprises scanning the image hologram with an optical beam reader.

8. The method of claim 7 and wherein transferring the conjugate wavefront onto a plate comprises:
   a. feeding the conjugate wavefront into an electron beam writer,
   b. writing the information from said electron beam writer onto a photo-resist plate,
   c. preparing a permanent plate from said photo-resist plate by replication or deposition.

9. The method of claim 7 and wherein transferring the conjugate wavefront onto a permanent plate comprises:
   a. feeding said conjugate wavefront information into a cutting machine and
   b. cutting a flat plate using said cutting machine.

10. A method of making a flat plate corrector for correcting complex phase aberrations in a window comprising the steps of:
    a. making an image hologram based on the wavefront created by the window,
    b. calculating the conjugate wavefront from the hologram, point by point,
    c. transferring the conjugate wavefront onto a permanent plate of either refractive or reflective material, and
    d. placing the permanent plate on one side of the window whereby phase aberrations caused by the window will be removed when a scene is viewed with incoherent light through the window and the permanent plate.

11. A corrector for use in correcting phase aberrations in a window comprising a flat body of material having imprinted thereon the conjugate wavefront obtained from a hologram made based on the aberrations of the window, the corrector being mounted on one side of the window to remove the aberrations when a scene is viewed therethrough with incoherent light.

12. A method of correcting complex phase aberrations in an optical surface comprising:
    a. making a hologram based on the wavefront created by the optical surface using coherent light,
    b. measuring the transmission over the hologram, point by point,
    c. digitizing the transmission information so measured,
    d. calculating in a computer the conjugate wavefront from the digitized transmission information,
    e. writing said conjugate wavefront information onto a plate, and
    f. mounting the plate on one side of the optical surface to remove aberrations in a scene being viewed therethrough with incoherent light.

13. Apparatus for use in preparing a corrector plate on either refractive or reflective material containing the conjugate wavefront needed to correct complex phase aberrations in a scene being viewed through an optical surface with incoherent light using a hologram prepared based on the wavefront created by said surface comprising:
   a. means for measuring the transmission of the hologram, point by point,
   b. means for calculating the conjugate wavefront from said measured transmission, and
   c. means for writing said conjugate wavefront onto a plate of material, the plate being mounted on one side of the optical surface and the scene being viewed with incoherent light through both the optical surface and the corrective plate to remove the aberrations.

14. A system for removing phase aberrations in a scene being viewed with incoherent light through a thick window comprising:
   a. a conjugate element,
   b. an imaging lens,
   c. said conjugate element being made by machining, and
   d. placing the conjugate element on one side of the window so that the scene being viewed wiht incoherent light therethrough is corrected for the phase aberrations.

15. The system of claim 14 and wherein the imaging lens is positioned between the window and the conjugate element and images the window onto the conjugate element with unit magnification.

16. The system of claim 15 and wherein the conjugate element has an aberrated surface and wherein the aberrated surface is aligned with the one to one image of the aberrations of the thick window.

17. The system of claim 16 and wherein the conjugate element is a refractive surface.

* * * * *

UNITED STATES PATENT AND TRADEMARK OFFICE
CERTIFICATE OF CORRECTION

PATENT NO. : 4,902,100
DATED : February 20, 1990
INVENTOR(S) : George O. Reynolds et al.

It is certified that error appears in the above-identified patent and that said Letters Patent is hereby corrected as shown below:

Col. 10, line 9, delete "wiht" and insert --with--.

Signed and Sealed this

Thirtieth Day of March, 1993

Attest:

STEPHEN G. KUNIN

*Attesting Officer*     Acting Commissioner of Patents and Trademarks